United States Patent [19]
Jamet

[11] Patent Number: 5,240,730
[45] Date of Patent: Aug. 31, 1993

[54] PROCESS FOR COOKING FOOD WITH HOT MOIST AIR

[75] Inventor: Luc Jamet, Beauvais, France

[73] Assignee: Nestec S.A., Vevey, Switzerland

[21] Appl. No.: 800,541

[22] Filed: Nov. 27, 1991

[30] Foreign Application Priority Data

Dec. 12, 1990 [EP] European Pat. Off. ........ 90123893.1

[51] Int. Cl.$^5$ ................................................ A23L 1/00
[52] U.S. Cl. .................................... 426/510; 426/511; 426/523
[58] Field of Search ............... 426/509, 510, 511, 520, 426/523, 233

[56] References Cited

U.S. PATENT DOCUMENTS

| | | | |
|---|---|---|---|
| 4,089,260 | 5/1978 | Brown et al. | 99/386 |
| 4,121,509 | 10/1978 | Baker et al. | 99/386 |
| 4,154,861 | 5/1979 | Smith | 426/523 |
| 4,338,911 | 7/1982 | Smith | 426/456 |
| 4,368,664 | 1/1983 | Smith et al. | 99/443 C |
| 4,385,074 | 5/1983 | Weibye | 426/511 |
| 4,474,498 | 10/1984 | Smith | 99/443 C |
| 4,533,515 | 8/1985 | Witter et al. | 426/407 |
| 4,831,238 | 5/1989 | Smith et al. | 219/400 |

FOREIGN PATENT DOCUMENTS

| | | |
|---|---|---|
| 603460 | 4/1926 | France . |
| 1484923 | 6/1966 | France . |
| 552016 | 3/1943 | United Kingdom . |

*Primary Examiner*—George Yeung
*Attorney, Agent, or Firm*—Vogt & O'Donnell

[57] ABSTRACT

A food is cooked by placing the food on a support grill positioned inside a chamber, introducing steam and air into the chamber to provide hot moist air, directing the hot moist air in a vertically descending flow towards and through the support grill so that the food is contacted and cooked by the hot moist air, and cooling the chamber floor to prevent equilibration between the temperature of the floor and the temperature inside the chamber.

7 Claims, 1 Drawing Sheet

PROCESS FOR COOKING FOOD WITH HOT MOIST AIR

BACKGROUND OF THE INVENTION

This invention relates to a process and an apparatus for cooking a food product with hot moist air.

More particularly, the present invention relates to the complete or partial cooking of a food product by jets of hot moist air directed onto the surface of the product to be treated. Installations in which thermal energy is transferred to a food product by circulation of hot moist air are known. In installations such as these, which are described for example in U.S. Pat. Nos. 4,831,238, 4,474,498 and 4,154,861, hot moist air is brought into contact with the upper and lower faces of a grill-type conveyor on which the products to be cooked are arranged, the products travelling on the grill-type conveyor into an oven comprising means for circulating the hot moist air on either side of the grill.

These circulation means are formed by one or more fans which are positioned laterally and at the top or bottom of the oven and which are connected to branch circuits dividing the flow of hot moist air established into a descending vertical stream and an ascending vertical stream on either side of the grill-type conveyor.

The product to be treated thus moves perpendicularly to the descending vertical stream and ascending vertical stream of hot moist air.

Arrangements of this type have major inadequacies which always make them difficult or impossible to use, depending on the product to be treated.

Firstly, the need to branch the flow of hot moist air combined with the upper and lower circulation of the flows on either side of the grill-type conveyor creates maintenance problems, particularly in that part of the installation situated below the grill-type conveyor where the ascending vertical circulation of the air flow takes place.

This is because the juices produced by the complete or partial cooking of the products inevitably drop into the lower part of the installation which therefore has to be periodically dismantled, the false floor provided, more particularly in U.S. Pat. No. 4,831,238, failing to prevent the cooking juices from accumulating on the walls of the lower hot moist air circuit situated between the grill-type conveyor and the false floor.

In addition and as specifically described in U.S. Pat. Nos. 4,368,664 and 4,338,911, which relate to another two variants of the installations described above, the combination of an upper, descending vertical circulation and a lower, descending vertical circulation means that the flows of hot moist air do not pass through the bed formed by the materials to be treated and the grill-type conveyor but, on the contrary, are deflected by that bed.

Accordingly, this reduces the circulation of the hot air flow on the lateral faces so that these zones are poorly cooked.

Thus and although two flows of hot moist air are provided on either side of the grill-type conveyor, the products to be treated still have to be moved by being turned over during the cooking process so that the lateral faces can be cooked.

Finally, the heating of the grill-type conveyor inevitably caused by the lower ascending vertical flux automatically produces an increase in the temperature of the conveyor which in turn is accompanied by adhesion, sticking and, occasionally, calcination of the product to be treated.

SUMMARY OF THE INVENTION

The problem addressed by the present invention was to permit treatment with hot moist air which, while avoiding adhesion problems, would provide for easy maintenance and for performance levels comparable with those of the prior art.

Accordingly, the present invention relates to a process for cooking a food product by contacting a vertical descending flow of hot moist air with a bed of product to be treated disposed perpendicularly to the flux of hot moist air passing through it. In particular, the process according to the invention comprises placing a food on a support grill positioned inside a chamber above a chamber floor, introducing steam and air into the chamber to provide hot moist air inside the chamber, directing the hot moist air in a vertically descending flow towards and through the support grill, so that the food is contacted and cooked by the flow of hot moist air passing through the support grill, and cooling the chamber floor to avoid equilibration between the temperature of the floor and the temperature inside the chamber.

The present invention also relates to an apparatus for carrying out this process comprising an enclosure with a support for the product to be treated in the form of a horizontal grill and means for delivering a flow of hot moist air, these means permitting only a descending vertical circulation of said flow through said support.

By virtue of this arrangement, there is no need to provide any means for delivering a flow of air to the lower face of the support for the product to be treated which would inevitably be soiled by the cooking juices of the product arranged on the conveyor.

In addition, no part of the support in contact with the product to be treated is simultaneously in direct contact with a flow of hot moist air on its opposite side. Accordingly, there is none of the troublesome heating of the support which causes the product to adhere to the support.

Finally, the passage of a vertical flow of hot air enables the lateral faces of the product to be treated which, in terms of treatment time, compensates for the absence of treatment of the lower faces. This is because, as in the prior art, the product still has to be turned over during cooking, in the present case to enable the lower faces of the product to be treated. However, this disadvantage is not an additional disadvantage, as has just been shown.

In addition, in the process and apparatus according to the invention, the dry temperature, the wet temperature and the treatment time are controlled as a function of the product to be treated and the desired results.

BRIEF DESCRIPTION OF THE DRAWING

Other features an advantages of the present invention will become apparent from the following description in conjunction with the accompanying drawing, which is provided solely by way of example and which is a schematic vertical section through the apparatus according to the invention.

DETAILED DESCRIPTION OF THE DRAWING

Figure 1:
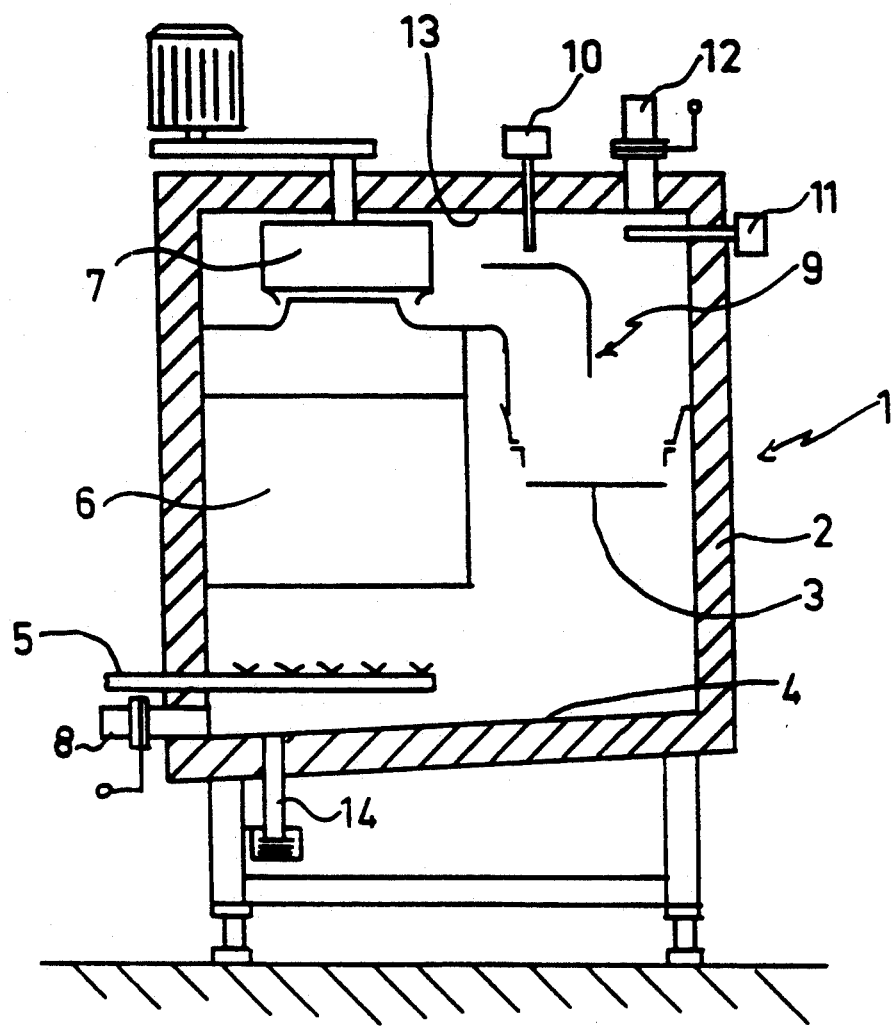

As shown in the drawing, the apparatus according to the invention is formed by an enclosure 1 having upper, lower and lateral faces and an insulating material 2.

A support grill is placed inside the enclosure 1— at mid-height in the illustrated embodiment. The food product to be treated is placed on this support.

The support is preferably formed by a grill-type conveyor belt 3 which circulates horizontally in accordance with a known arrangement such as described, for example, in U.S. Pat. No. 4,831,238.

The sole FIGURE of the accompanying drawing is a vertical section taken perpendicularly to the direction of circulation of the conveyor belt 3. As can be seen from the drawing, a floor 4 of the enclosure 1 is inclined. More precisely, the floor 4 is inclined in relation to a horizontal line perpendicular to the direction of circulation of the conveyor belt 3.

The floor 4 may be cooled to prevent the cooking juices from adhering to the floor 4. The cooling effect may be provided by the circulation of water in the floor 4.

The floor tends to come into equilibrium with the atmosphere of the enclosure and, unless it is cooled, can thus assume the dry temperature of the enclosure. Now, this dry temperature can be a high temperature, as the Examples will show.

The floor 4 may form a lower face of the enclosure 1 or may be attached in the form of a false floor to that lower face which may thus be horizontal, as described for example in U.S. Pat. No.4,831,238.

In addition, means are provided in the enclosure 1 to deliver a flow of hot moist air in a descending vertical direction from a zone situated above the conveyor belt 3 through the conveyor belt 3.

In the embodiment illustrated in the sole FIGURE, these means for delivering the flow of hot moist air are formed by a steam source 5 situated at the bottom of the enclosure 1. Provided above the source 5 adjacent the conveyor belt 3 is a heater 6 surmounted by a fan 7 which draws in the steam coming from the source 5 and the moist air situated beneath the heater 6 and the conveyor belt 3.

In addition, an air supply source 8 independent of the steam source 5 is provided near and preferably below the steam source 5.

Accordingly, a flow of hot moist air issues from the fan 7 which is extended by a circuit 9 for delivering this hot moist air flow to the upper face of the conveyor belt 3 in a descending vertical direction.

A wet thermometer 10, a dry thermometer 11 and a vent 12 situated in the ceiling 13 of the enclosure 1 are provided in the circuit 9. Finally, means 14 for draining the condensed liquids and the cooking juices are provided at the bottom of the enclosure 1 in the lower part of the floor 4.

The present invention is further illustrated by the following nonlimitative Examples:

EXAMPLE 1

Raw turnips between 40 mm and 70 mm in size were peeled and then diced into pieces measuring $8 \times 12 \times 12$ mm.

The turnips were then treated by the process and apparatus according to the invention for 14 minutes in a quantity of 14 kg/m$^2$, at a dry temperature of 120° C. and a wet temperature of 85° C.

The product obtained was then cooled for 5 minutes to 20° C. and subsequently frozen at −40° C. and stored at −30° C.

The product was readily regenerated simply by heating and had the appearance of freshly prepared turnips with no denaturing or weakening of their taste.

EXAMPLE 2

Onions were peeled and cut and then soaked in oil.

They were then treated in accordance with the invention for 10 minutes at a dry temperature of 160° C. and a wet temperature of 87° C. in a quantity of 17 kg/m$^2$.

The onions were then cooled in ambient air for a few minutes and subsequently frozen.

After regeneration, the product had the appearance, the texture and the taste of browned onions fried slowly in a frying pan while retaining their freshness and their piquancy and with no taste of fat.

Despite the high dry temperature and the use of oil, the process took place normally with no signs of troublesome adhesion. In addition, the apparatus demonstrated its ease of maintenance after drainage of the cooking juices.

EXAMPLE 3

Carrots were washed, peeled and finally cut up.

They were treated with moist air for 14 minutes at a dry temperature of 100° C. and a wet temperature of 96° C. in a quantity of 23 kg/m$^2$.

Finally, the product was cooled with ambient air and subsequently frozen.

After regeneration, the product obtained had all the organoleptic characteristics of carrots freshly cooked with steam.

These Examples clearly demonstrate that, while providing for much easier maintenance of the installation and avoiding adhesion of the product to its support, the performances of the installation and the quality of the products obtained are entirely comparable with those of the prior art.

I claim:

1. A process for cooking a food comprising:
   placing a food on a support grill positioned inside a chamber above a chamber floor;
   introducing steam and air into the chamber to provide hot moist air inside the chamber;
   directing the hot moist air in a vertically descending flow towards and through the support grill, so that the food is contacted and cooked by the flow of hot moist air passing through the support grill; and
   cooling the chamber floor to avoid equilibration between the temperature of the floor and the temperature inside the chamber.

2. A process according to claim 1 wherein the floor is cooled by circulating water in the floor.

3. A process according to claim 1 wherein the support grill comprises a circulating conveyor belt.

4. A process according to claim 1 further comprising heating the hot moist air inside the chamber before directing the flow of hot moist air towards and through the support grill.

5. A process according to claim 4 wherein the heated hot moist air is drawn through a fan and then passed in a vertically descending flow through a circuit positioned above the support grill.

6. A process according to claim 1 further comprising draining condensed liquids from the chamber.

7. A process according to claim 1 further comprising turning, the food on the support grill after passing the flow of hot moist air through the food and then directing a vertically descending flow of hot moist air through the turned food.

* * * * *

UNITED STATES PATENT AND TRADEMARK OFFICE
CERTIFICATE OF CORRECTION

PATENT NO. : 5,240,730
DATED : August 31, 1993
INVENTOR(S) : Luc JAMET

It is certified that error appears in the above-identified patent and that said Letters Patent is hereby corrected as shown below:

Column 1, line 14, insert a comma before and after "for example".

Column 3, between lines 53 and 54, insert --EXAMPLES--.

Column 4, line 64 (line 2 of claim 7), delete the comma after "turning".

Signed and Sealed this

Twenty-ninth Day of March, 1994

Attest:

BRUCE LEHMAN

*Attesting Officer*  *Commissioner of Patents and Trademarks*